United States Patent [19]

Yum

[11] Patent Number: 4,624,624
[45] Date of Patent: Nov. 25, 1986

[54] COLLAPSIBLE VERTICAL WIND MILL

[76] Inventor: Nak I. Yum, 1035, Aza Kakazu, Ginowan-City, Okinawa-Pref., Japan

[21] Appl. No.: 715,462

[22] Filed: Mar. 25, 1985

[30] Foreign Application Priority Data

Mar. 26, 1984 [JP] Japan .................................. 59-56367
Mar. 19, 1985 [JP] Japan .................................. 60-53426

[51] Int. Cl.⁴ .............................................. F03D 3/06
[52] U.S. Cl. ................................. 416/87; 416/132 B; 416/142
[58] Field of Search ........... 416/87, 88, 227 A, 132 B, 416/142 B

[56] References Cited

U.S. PATENT DOCUMENTS

| | | | |
|---|---|---|---|
| 1,319,174 | 10/1919 | Ochoa | 416/135 A |
| 3,918,839 | 11/1975 | Blackwell et al. | 416/227 A X |
| 4,082,479 | 4/1978 | Rangi et al. | 416/227 A X |
| 4,084,102 | 4/1978 | Fry et al. | 416/85 X |
| 4,115,032 | 9/1978 | Lange | 416/227 A |
| 4,142,822 | 3/1979 | Herbert et al. | 416/23 X |
| 4,329,116 | 5/1982 | Ljungström | 416/227 A X |
| 4,422,825 | 12/1983 | Boswell | 416/132 B |
| 4,470,563 | 9/1984 | Engelsman | 416/85 X |

FOREIGN PATENT DOCUMENTS

| | | | |
|---|---|---|---|
| 0021790 | 1/1981 | European Pat. Off. | 416/227 A |
| 049634 | 4/1982 | European Pat. Off. | |
| 2923517 | 12/1980 | Fed. Rep. of Germany | 416/85 |
| 2298707 | 8/1976 | France | 416/227 A |
| 32076 | 2/1982 | Japan | 416/227 A |
| 70961 | 5/1982 | Japan | 416/227 A |
| 7606729 | 12/1977 | Netherlands | 416/132 B |
| WO80/00733 | 4/1980 | PCT Int'l Appl. | 416/197 A |

Primary Examiner—Everette A. Powell, Jr.
Attorney, Agent, or Firm—Holman & Stern

[57] ABSTRACT

A collapsible vertical wind mill is disclosed, which comprises four main wings arranged in a rhombic form having a pair of opposed corners fitted on a shaft and auxiliary wings each provided on each of the main wings. The upper one of the pair corners on the shaft is fitted via a bearing capable of movement along the shaft. The other pair of opposed corners of the rhombic structure each have a hinged structure capable of variation of the angle.

18 Claims, 20 Drawing Figures

FIG.14
FIG.15
FIG.16
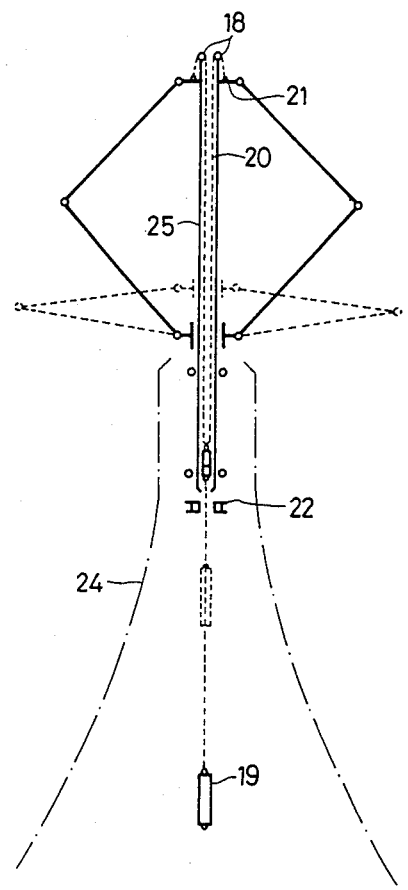
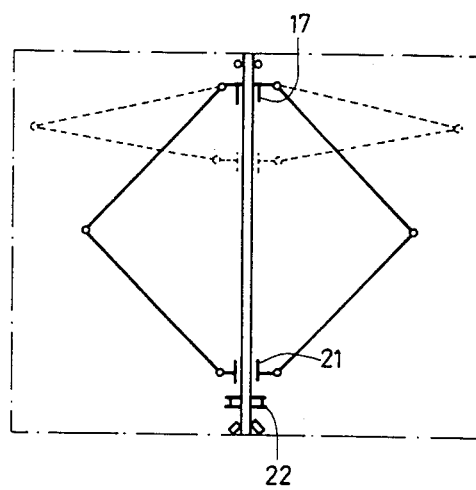
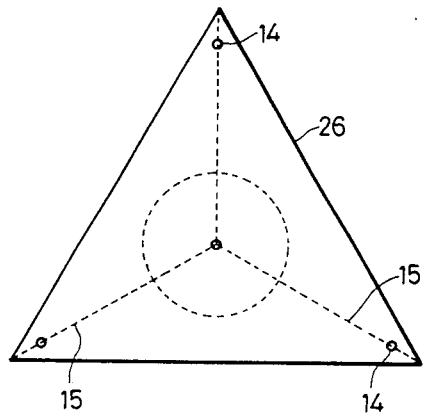

COLLAPSIBLE VERTICAL WIND MILL

BACKGROUND OF THE INVENTION

1. Field of the Invention

This invention relates to a collapsible vertical wind mill and, more particularly, to a highly safe vertically collapsible wind mill, which has a self-starting function, a capability of withstanding strong winds and a capability of self-adjusting the revolving rate according to the exerted wind pressure through automatic deformation of a main wing assembly according to the momentum thereof.

2. Description of the Prior Art

Winds on earth are one of the most readily utilizable types of natural energy to the mankind.

The wind, therefore, had been used in practice in various forms before the development of the modern industries.

However, the utilization of wind mills which convert winds into energy had been on the decline with the utilization of electric and steam energy based on coal, petroleum, gas, etc. and also the development of various internal combustion engines. At present, wind mills can be seen, which are mostly present for the purpose of sightseeing rather than for practical purposes.

In the recent insufficient energy circumstances, various energy sources are reconsidered, and there is deep interest again on the utility of wind forces as part of the overall energy resources.

As an example, there has been proposed a method of increasing the speed of air stream to obtain output in excess of a predetermined amount and driving a turbine by utilizing the increased speed air stream thus obtained (as disclosed in Japanese Patent Disclosure 51-41150). In this method, however, turbine blade portion is comparatively complicated and the maintenance thereof is not so easy.

Also, there is a wind mill of vertical type, which has a feature that the dimension of the wind mill can be reduced for the same output (as disclosed in Japanese Patent Publication 53-44972). This structure, however has too many movable components, and its improvement is desired from the consideration of the installation and maintenance in mountain areas.

As for the structure of the wind mill, various types have been proposed, including horizontal shaft types such as propeller type and turbine type, a Robinson cup type, a rotor application type and Robinson cup application type. These types of the structure have own merits and demerits. Inconvenience that is found in these cases is that it is necessary to match the rotor in a particular direction with respect to the direction of wind and that it is necessary to provide acceleration to the rotor in an initial stage of operation.

More specifically, in a conventional Darrieus type wind mill (including straight wing type), it is difficult to obtain the start without use of any other forces than wind force, and it is necessary to combine this wind mill with a Savonius wind mill or incorporate an electric motor.

Further, spoiler or braking means such as an electromagnetic brake or manual brake that require additional expenditure are necessary to suppress excessive rotation of the wind mill when prevailing winds are strong (e.g., with air speed of 15 m/sec. or above).

SUMMARY OF THE INVENTION

This invention seeks to provide a high safety wind mill, which has a self-starting function, capacity of withstanding strong winds and a function of self-adjustment according to the wind force.

To attain the above of the invention, there is provided a wind mill, which comprises a shaft, four main wings arranged in a rhombic form having a pair of opposed corners fitted on the shaft, the upper one of the pair corners being fitted on the shaft via a bearing capable of movement along the shaft, the other pair of opposed corners of the rhombic structure each having a hinged structure capable of variation of the angle, and auxiliary wings each provided on each of the main wings.

BRIEF DESCRIPTION OF THE ACCOMPANYING DRAWINGS

FIG. 14 is a side view showing a wind mill installed atop a tower;

FIG. 15 is a front view a wind mill capable of being folded upwardly;

FIG. 16 is a plan view showing a wind mill installed on a floating platform;

DETAILED DESCRIPTION OF THE PREFERRED EMBODIMENTS

Figure 1:
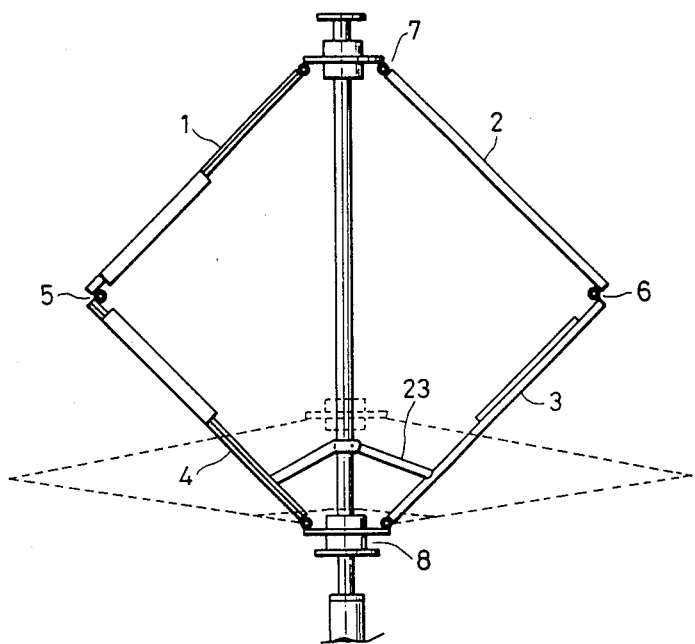
FIG. 1 is a schematic front view showing main wings of a rhombic wind mill according to the invention.

FIG. 1 shows one embodiment of the wind mill according to the invention, comprising main wings 1 to 4 which are arranged in a rhombic form. The vertically opposed corners 7 and 8 of the rhomb, are rotatably fitted on a center shaft.

The inner ends of the main wings 1 to 4 are hinged by hinges to upper and lower rings. The upper ring is slidable along the shaft, while the lower ring is held at a fixed vertical position relative to the shaft. Both rings, however, can be rotated in unison with each other according to the angle variations of the main wings.

The other corners 5 and 6 have a hinged structure capable of variation of the angle.

Figure 2:
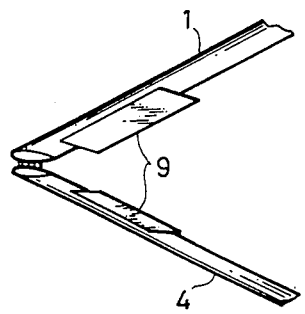
FIG. 2 is a fragmentary perspective view showing a structure with auxiliary wings provided on the main wings.

As shown in FIG. 2, each of the main wings 1 to 4 is provided with a projecting auxiliary wing 9 like a fin.

With the provision of the auxiliary wings 9, torque can be generated without requiring any other drive force than the wind at the time of the start.

The auxiliary wing 9 provided on each of the main wings 1 to 4, is preferably made of a material, which has a sufficient mechanical strength so that it will not be broken apart by the wind and also has such a flexibility that it flutters just like a flag due to winds. The most readily available example of the material is the boat canvas cloth and other weather-proof synthetic resin sheets.

Figure 3:
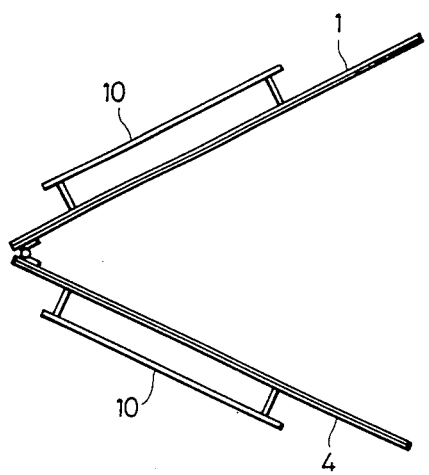
FIG. 3 is a fragmentary front view showing main wings of a different embodiment of the invention.
Figure 4:
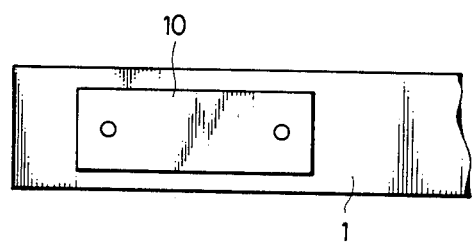
FIG. 4 is a fragmentary plan view of a main wing portion shown in FIG. 3.

FIGS. 3 and 4 show a different embodiment of the invention. In this embodiment, a rigid auxiliary wing 10 is provided on each of the main wings. The auxiliary wing 10 is formed integrally with the main wing, and it may of the same or different material from that of the main wing. The corners 5 and 6 of the main wing rhomb have a hinged structure capable of variation of the angle.

The rhombic wind mill according to the invention has an important feature in the hinged structure noted above. The corners 5 and 6 are given forces tending to spread them, i.e., increase their angle, by means of springs adjusted to a predetermined tension or other members having the same function.

When the rotational speed of the wind mill rotated by wind forces increases, the centrifugal forces due to the rotational moment is increased. When the centrifugal force surpasses the tension of the springs, the rhombic structure of the wind mill functions to reduce its height (i.e., increase the distance between the opposed hinged corners) as shown by broken lines in FIG. 1 to minimize the influence of the wind. In the converse situation, the structure functions to increase its height so as to receive sufficient wind force as a whole.

The center shaft 12 may be provided with a ring stopper 30 to provide a lower limit of the height of the wind mill.

The rhombic wind mill according to the invention, which is capable of automatic adjustment of the revolving rate, is rotated at a high speed with an extended height up to a constant wind velocity, but as the wind velocity is increased beyond the constant velocity, it gradually reduces its height to ensure safety. Thus, it can withstand very strong winds (e.g., winds when there is a typhoon).

While the wind mill according to the invention basically has the construction as described above, it can be applied and modified variously.

For example, where the wind mill has a small scale as a whole, the main wing 1, 4 (or 2, 3) shown in FIG. 1 may have a uniform width as shown in FIG. 5a and a uniform thickness as shown in FIG. 5b. When the size of the wind mill is increased, however, the lower main wing 4 (or 3) is liable to the twisted due to a high load applied to it.

To cope with this, the main wings 1 to 4 are desirably tapered both in their width and thickness as shown in FIGS. 6a and 6b. Where the main wings have such a tapered shape, the weight of an upper portion of the wind mill, and hence the weight of the overall wind mill, can be reduced.

Figure 5:
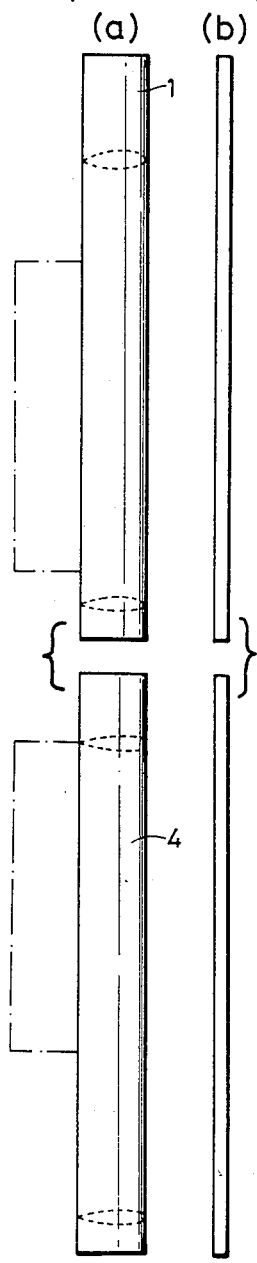
FIGS. 5a and 6a are plan views showing a main wing.
FIGS. 5b and 6b are side views showing the main wings.
Figure 6:
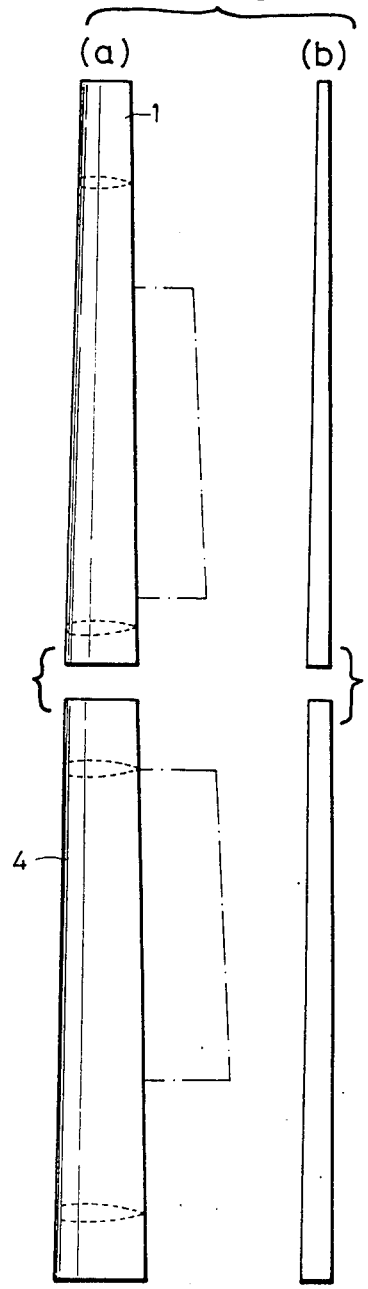
Figure 7:
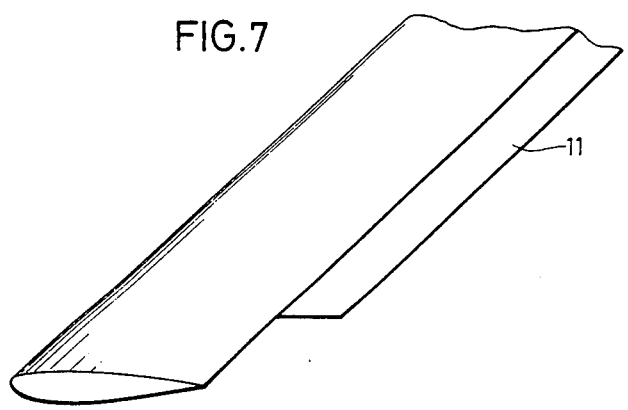
FIG. 7 is a fragmentary perspective view showing the main wing.

In FIGS. 5 and 6, phantom lines indicate auxiliary wings 9 of flap type. Although the auxiliary wing 9 may be mounted in the manner as shown in FIG. 3, most usually a flexible auxiliary wing 9 is mounted on an auxiliary wing support plate 11 as shown in FIG. 7.

Figure 8:
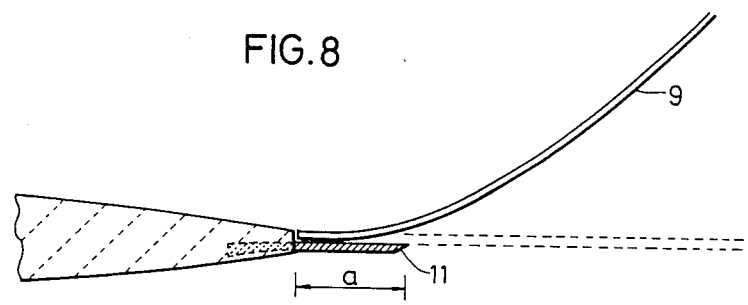
FIG. 8 is a fragmentary bottom view showing the main wing.

FIG. 8 shows the auxiliary wing 9, which is mounted on the main wing in the manner as described, in its operative state.

Experiments have proved that satisfactory results could be obtained by merely bonding the auxiliary wing 9 to the auxiliary wing support plate 11 over an area thereof corresponding to one half the width a thereof.

According to the invention, a plurality of wind mills having the construction as described above can be used in combination.

Figure 9:
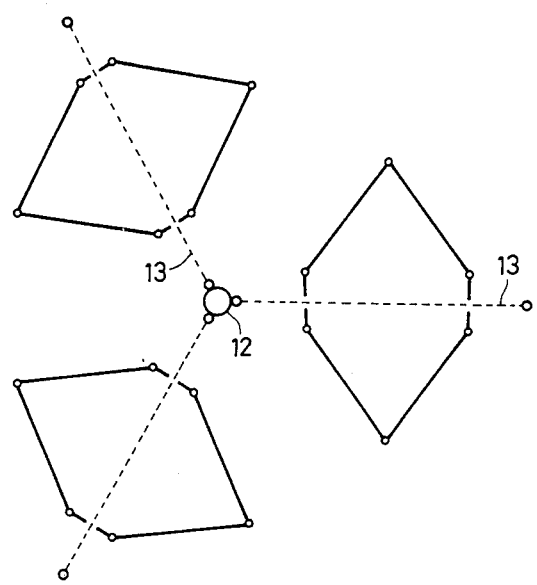
FIG. 9 is a plan view showing a star arrangement of three wind mills.

FIG. 9 illustrates in plan view the concept of use of a plurality of, i.e., three, wind mills as a set. In this instance, three wind mills are mounted on respective support wires 13 which are stretched from a center pole 12 in a radially uniform spacing with respect thereto.

Figure 10:
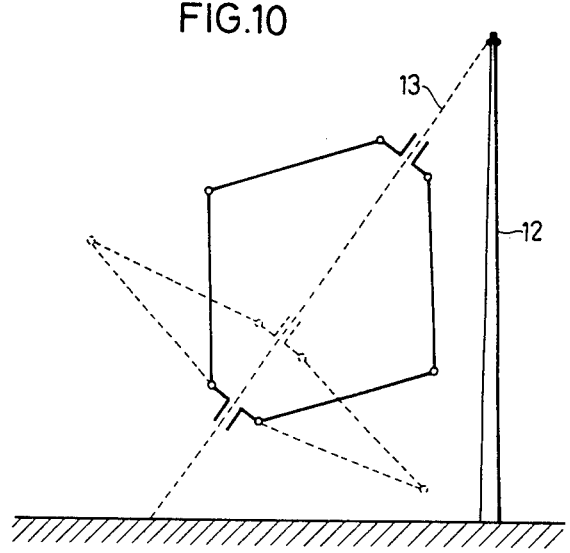
FIG. 10 is a front view showing part of the arrangement of FIG. 9.

FIG. 10 is a side view of noe of the wind mills shown in FIG. 9.

Figure 11:
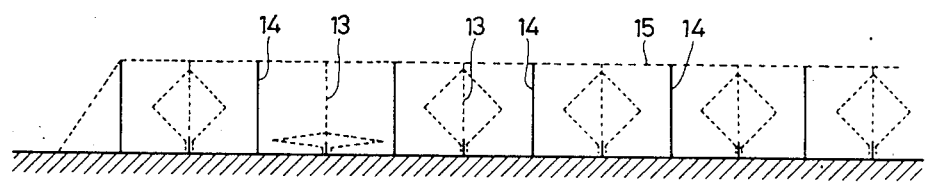
FIG. 11 is a side view showing an arrangement of a plurality of wind mills in a row.

FIG. 11 shows a different example of arrangement of a plurality of wind mills. In this instance, a plurality of wind mills are mounted on respective support wires 13 which are stretched form a connecting wire 15 connecting plural poles 14 erected in a row. The poles may not be erected in a row, but they may be erected in a zig-zag form, a circular form or in any other desired form to meet a geographical condition or other conditions.

Figure 12:
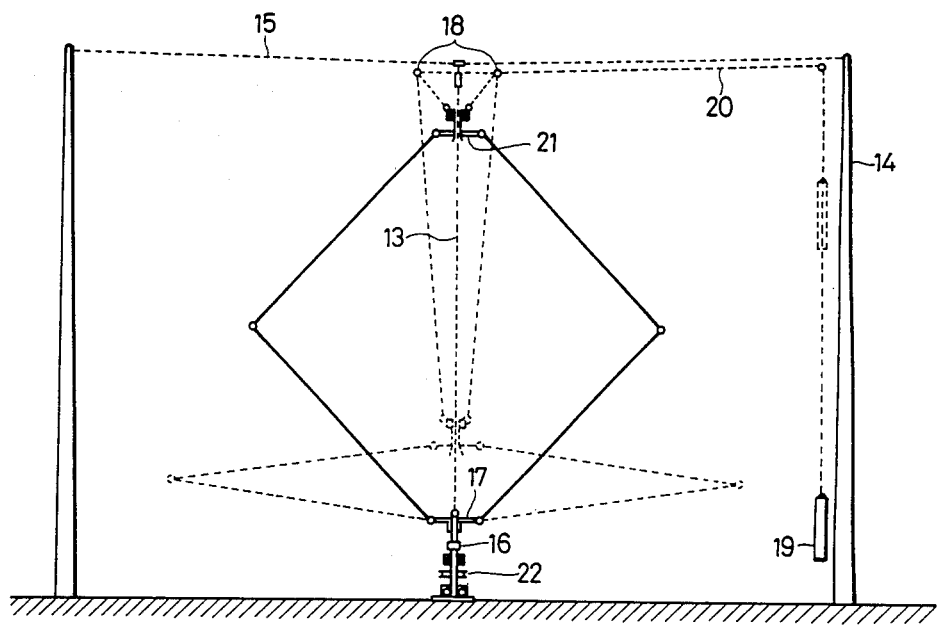
FIG. 12 is a side view showing a wind mill with a weight used as a balancer.

FIG. 12 shows an example of large size wind mill, a plurality of which may be arranged in the manner as shown in FIG. 11.

In this instance, a horizontal connecting wire 15 is stretched between two poles 4 (which may be electric poles), and a anti-twist member is provided on the wire 15 at a mid point thereof. A shaft wire 13 (or a pile-like or rod-like shaft) is tied at one end to the anti-twist member and at the other end to a stationary flange 7 of a universal joint 16 such that it is stretched taut. The lower end of wind mill is hinged to the stationary flange 17. In this arrangement, the wind mill and shaft wire are rotated in unison with each other.

The upper, vertically movable end of the wind mill is provided with a pulley 18, to which is coupled a wire having a weight 19 provided at the other end. The wright 19 serves as a counterweight with respect to a vertical displacement of a slide flange 21 caused with an increase or decrease of the revolving rate.

In this case, vibrations of the wind mill that may occur at this time would be absorbed by the horizontal connecting wire 15 and shaft wire 14 to reduce influence on the output pulley 22.

Figure 13:
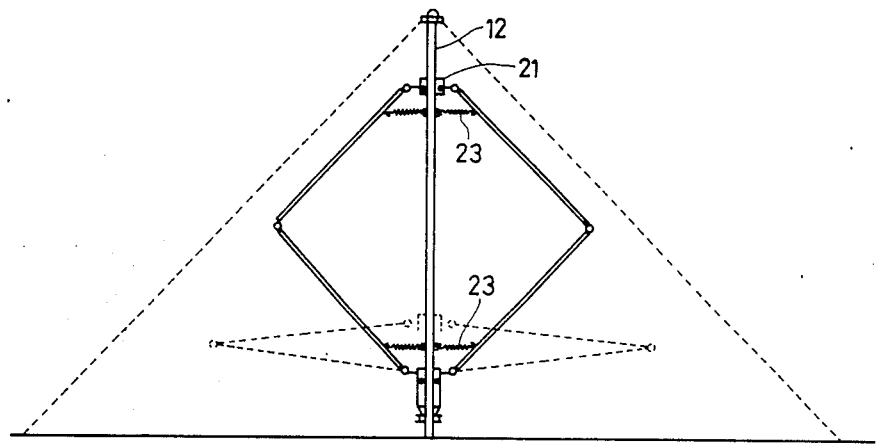
FIG. 13 is a side view showing an independent wind mill employing springs.

While in the case of FIG. 12 the weight 19 is provided to provide for a balance with respect to a change in shape of the wind mill according to the revolving rate thereof, the same effect may be attained with springs 23 as shown in FIG. 13, which shows an example of an independent wind mill. Further, the same effect may be obtained with leaf springs. FIG. 14 shows a further embodiment, which makes use of a tower or like structure 24. This case is an example of wind mill, which is required to have a narrow and tall appearance.

In this wind mill, the main wings are coupled to a steel pipe shaft 25 which can rotate in unison with the wind mill. The steel pipe shaft is supported only at two lower positions by bearings, and no support wire is needed.

The main wings of the wind mill need not always be folded downwards. FIG. 15 shows an example of the wind mill, of which the upper end is stationary. Whether the upper or lower end of the wind mill is to be selected as a stationary end is a matter of design.

As a further mode of the wind mill according to the invention, it can be installed on an oceanic structure, e.g., a floating platform.

Figure 17:
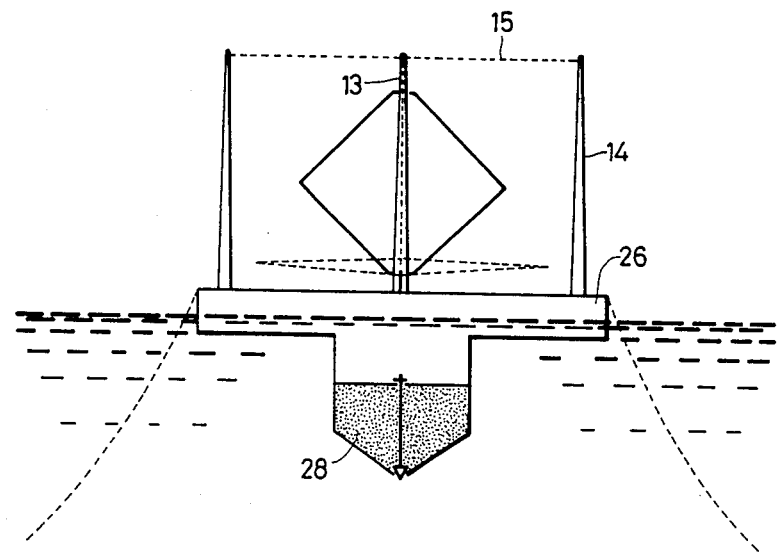
FIG. 17 is a side view showing the wind mill of FIG. 16.

FIGS. 16 and 17 shows a specific example of this mode of wind mill. In this instance, three poles 14 are erected on a floating platform 26. Three support wires 15 stretched from the respective poles 14 are connected by star connection such that the connection point is at the center of a right triangle with the vertexes corresponding to the poles. A shaft wire 13 which supports the wind mill depends from the star connection point, and it is connected to the floating platform 26 at the other end. The floating platform with the wind mill may be carried to a desired offshore place where it may be anchored to the sea bed by means of anchor chains 27. Reference numeral 28 designates a ballast of the floating platform 26.

Figure 18:
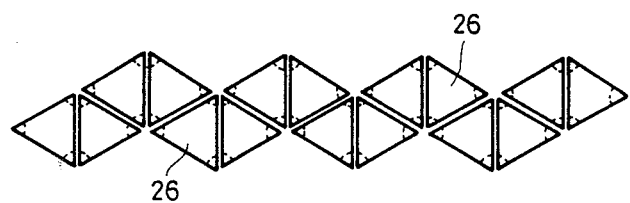
FIG. 18 is a plan view showing an arrangement of a plurality of wind mills shown in FIG. 16.

FIG. 18 is a plan view showing an arrangement of a plurality of floating platforms 26 with wind mill.

Figure 19:
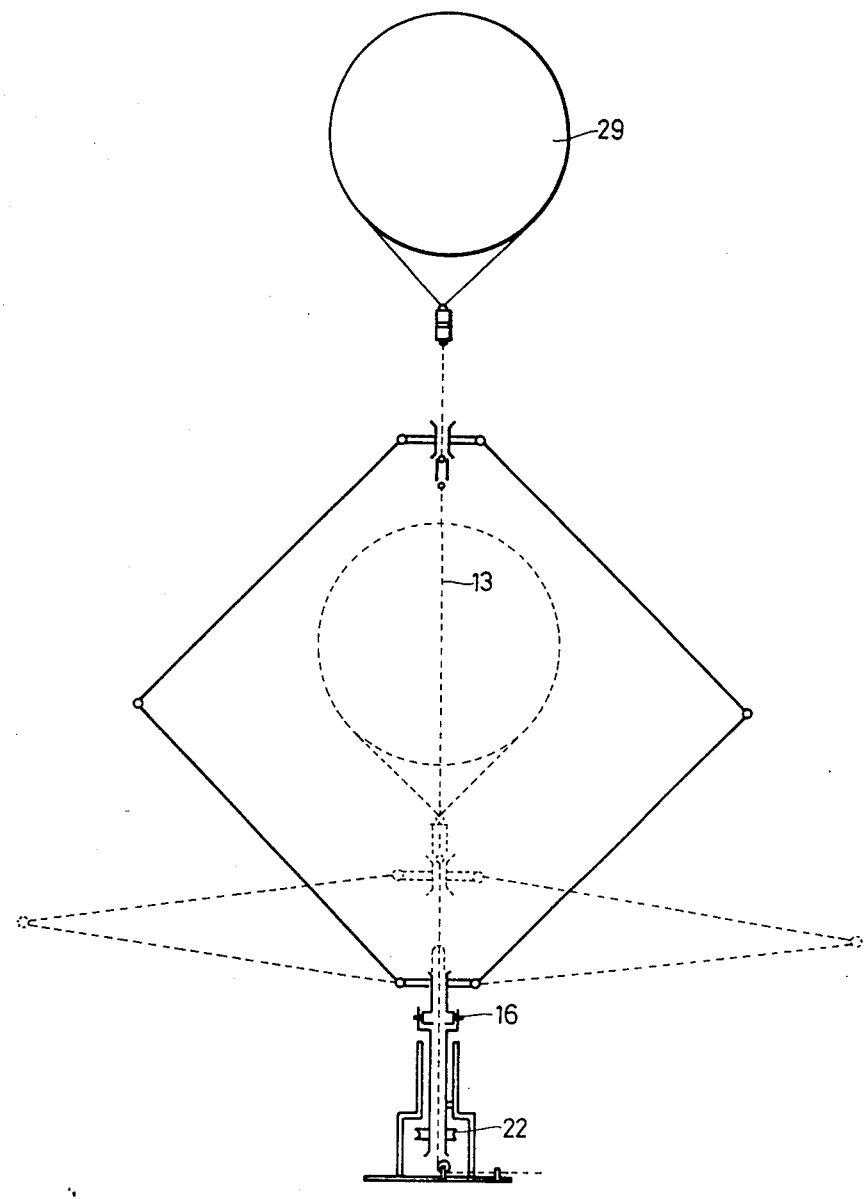
FIG. 19 is a front view showing a wind mill using a baloon.

FIG. 19 shows a yet further mode of the wind mill according to the invention. In this instance, a baloon 29 is employed. This example requires use of none of the center pole 14, poles 14, wires 15 and weight 19. Because of, the baloon 29 as the balancer. This wind mill, therefore, is very simple, convenient and effective.

So long as the wind pressure exerted is within a design wind pressure, the baloon 29 can float, so that even if the shaft wire 13 is included to the ground surface, the rotational energy received by the wind mill can be completely transmitted through the universal joint 16 to the output pulley 22 and utilized for power generation and other purposes. The shaft wire between the baloon 29 and wind mill has to be provided with an anti-twist member, it is to be desired that more light weight for main wings.

Figure 20:
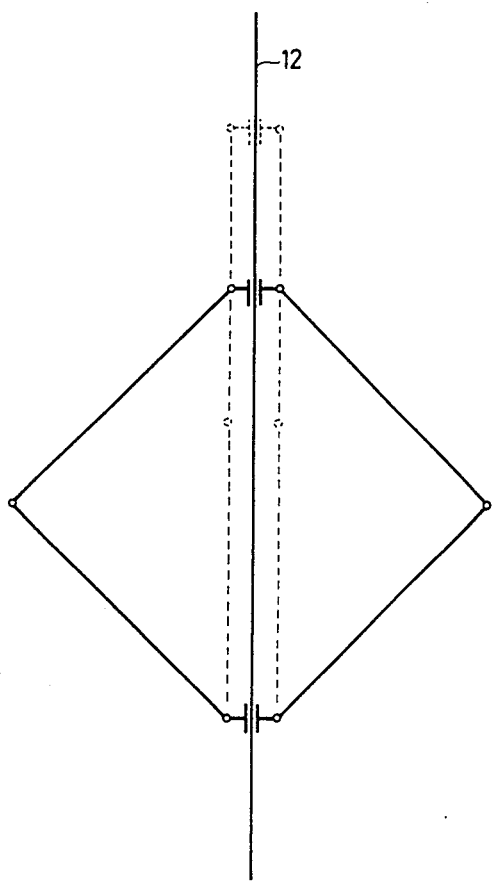
FIG. 20 is a front view showing a wind mill capable of being folded along a center shaft.

FIG. 20 shows a last embodiment of the wind mill according to the invention. In this instance, the main wings are folded along the center shaft 12. Again in this case, it is possible to reduce the wind receiving area. In addition, this wind mill can be utilized where it has to be accommodated in a limited or elongate space.

The main wings of the wind mill may be lowered by pulling a suspended spring or, in case of a large scale wind mill, by means of a winch.

ADVANTAGES OF THE INVENTION

As has been shown, the collapsible vertical wind mill according to the invention can change its vertical dimension according to the wind velocity without changing its basic rhombic form. Thus, it can effectively receive winds blowing in horizontal directions and also winds blowing in oblique directions or vertical directions. With this directivity of the wind mill with respect to winds, it may be installed obliquely without substantial loss of the wind receiving area and, in an extreme case, it can be installed such that the center shaft extends horizontally.

Since the height of the entire wind mill according to the invention can be varied, the operation of installation, and repair and maintenance services can be carried out safely by fixing the whole rhombic structure at a safe and convenient height.

What is claimed is:
1. A collapsible vertical wind mill comprising:
    a vertically extending center shaft;
    four linear main wings, hinge means interconnecting the wings in a rhombic form capable of corner angle varition with opposed upper and lower corners penetrated by said center shaft, and with hinged outer corners between the upper and lower corners, said lower corner of said rhomb being formed by an attachment located at a fixed position with respect to said vertical center shaft, said upper corner of said rhomb being constituted by a slidable ring slidable along said vertical center shaft;
    a ring stopper provided on said vertical center shaft at a lower position thereof for providing a lower limit position of said slidable ring; and
    auxiliary wings each provided on each of said main wings.
2. The collapsible vertical wind mill according to claim 1, wherein said auxiliary wings each project from each said main wing.
3. The collapsible vertical wind mill according to claim 1, wherein one end of each said auxiliary wing is secured to each said main wing while the other end is a free end.
4. The collapsible vertical wind mill according to claim 1, wherein said auxiliary wings are made of a flexible material.
5. The collapsible vertical wind mill according to claim 1, wherein said auxiliary wings are made of a soft synthetic resin sheet.
6. The collapsible vertical wind mill according to claim 1, wherein said auxiliary wings are made of a synthetic resin cloth.
7. The collapsible vertical wind mill according to claim 1, wherein the auxiliary wings have a length equal to about one half the length of said main wings.
8. The collapsible vertical wind mill according to claim 1, wherein said auxiliary wings are provided near the hinged structure.
9. The collapsible vertical wind mill according to claim 1, wherein said auxiliary wings are rigid members each secured to each said main wing.
10. The collapsible vertical wind mill according to claim 9, wherein said auxiliary wings are made of the same material as said main wings.
11. The collapsible vertical wind mill according to claim 2, wherein said auxiliary wings have a length equal to about one half the length of the main wings.
12. The collapsible vertical wind mill according to claim 9, wherein said auxiliary wings are provided near said hinged structures.
13. The collapsible vertical wind mill according to claim 1, wherein the width or thickness or both of the width and thickness of said main wings is gradually reduced from the lower end toward the upper end.
14. The collapsible vertical wind mill according to claim 1, wherein said center shaft is a shaft wire stretched obliquely from a pole.
15. A collapsible vertical wind mill comprising a plurality of wind mills according to claim 1 as component wind mills, the center shafts of said component wind mills being shaft wires stretched from a center pole in different directions.
16. A collapsible vertical wind mill comprising a plurality of wind mills according to claim 1 as compo- nent wind mills, the center shafts of said component wind mills being shaft wires each depending from a wire stretched between two poles.

17. The collapsible vertical wind mill according to claim 1, which further comprises a weight serving as a balancer with respect to a change in the shape of the wind mill.

18. The collapsible vertical wind mill according to claim 1, which further comprises spring means serving as a balancer with respect to a change in the shape of the wind mill.

* * * * *